UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

RUBBER AND METHOD OF OBTAINING THE SAME.

1,322,518. Specification of Letters Patent. Patented Nov. 25, 1919.

No Drawing. Application filed February 27, 1917. Serial No. 151,348.

*To all whom it may concern:*

Be it known that I, LOUIS E. BARTON, a citizen of the United States, residing at Niagara Falls, in the State of New York, have invented certain new, and useful Improvements in Rubber and Methods of Obtaining the Same, of which the following is a specification.

The invention relates to rubber products, and their manufacture, and its objects comprise imparting thereto, more easily, speedily, certainly, and economically than heretofore, desired properties whereby tensile strength, toughness, set and stretch are, according to requirement, respectively, or uniformly, increased and colorations, whiter than hitherto imparted.

I attain these objects by my herein described novel rubber products, the which are dependent upon my discovery that titanium in a state of chemical combination, and preferably in the form of titanic oxid ($TiO_2$), possesses peculiar properties which enable it when, analogously to a "filler," incorporated with rubber to impart to the latter, and to the resulting mixture, novel characteristics and behavior to which are attributable the improved, and novel, qualities and properties of my final rubber products.

My said novel compositions of matter are, by the practice of my novel methods obtained, for example, as follows, viz:

The rubber, washed as usual, is "worked" as usual in the usual compounding rolls, until the mass becomes warm and plastic. There is then, the rolling being continued, added thereto gradually, and in successive quantities, the preferred compound of titanium, in this instance, titanic oxid ($TiO_2$), to the extent required to impart such quality or consistency to the final product as may be desired.

If the mixture is to be vulcanized, I prefer to simultaneously incorporate the required sulfur, by aid of preliminarily thoroughly mixing the latter with the titanic oxid, and adding such mixture as aforesaid until sufficiently incorporated. After thorough incorporation the mass is, as usual, removed from the rolls, sheeted, or formed, and then vulcanized, or cured.

As to proportions of the materials, these will be varied by those skilled in the art according to circumstances and the particular properties sought in the final products. For an example, I have found that when body, toughness, and strength are particularly required, as for automobile tire treads, a mixture of 450 parts, by weight, of titanic oxid with 50 parts of sulfur, added to 500 parts of the washed rubber, gives good results, the final vulcanized product showing, on test, great toughness, high tensile strength, and the desired degree of stretch, and set, the coloration being also much whiter than attainable by corresponding additions of any of the "white pigment" fillers utilizable for the purpose.

My tests and operations disclose that the titanic oxid has apparently an exceptionally great affinity for the rubber, since, during the compounding, it slides in rapidly and does not form hard scales, nor does it cake unduly upon the metal surface of the rolls, as is too often characteristic of other additions. It also apparently hastens the vulcanization, since without aid of the usually added "accelerators," the curing takes place with very great, if not unprecedented, rapidity.

The titanic oxid also imparts to the mass an intense, and to the final vulcanized product an unprecedently great, degree of whiteness, which seems attributable to its index of refraction being higher (2.5 to 2.9) than that of any other than titanic pigment substance utilizable, for the purpose, in rubber, and, therefore, its hiding, or coloring, power and effects thereon proportionately greater.

The titanic oxid is distinctively uninjurious to the rubber, since the exceptionally refractory character of the former renders it correspondingly stable, both during vulcanization, and thereafter throughout the life of the final product,—it thus neither liberating nor attracting reagents deleterious to rubber, such, for example, as oxygen.

The titanic oxid is, also, for the purpose, especially advantageous owing to its low specific gravity (not exceeding 4.25) as compared with that of most other pigment, rubber-compounding, substances.

While titanic oxid in any form is available, I prefer to employ, for my said purposes, owing to their purity, whiteness, low specific gravity, fineness and smoothness, one, or more, of those powdered forms of titanic oxid concentrates obtainable by aid of such processes as are disclosed in U. S.

Letters Patent granted to Auguste J. Rossi and myself Nos. 1,106,406, 1,106,407, 1,106,408, 1,106,409, 1,106,410, dated August 11, 1914, No. 1,166,547, dated January 4, 1916, No. 1,171,542, dated February 15, 1916, and Nos. 1,196,029, 1,196,030, 1,196,031, dated August 29, 1916; also, to myself, No. 1,189,229, dated July 4, 1916, No. 1,201,541, dated October 17, 1916, and Nos. 1,206,796, 1,206,797 and 1,206,798, dated December 5, 1916.

Having now described my invention, what I claim as new and desire to secure by Letters Patent, is the following, viz:

1. Rubber having therewith incorporated a chemical compound of titanium.

2. Rubber having therewith incorporated titanic oxid.

3. Rubber having therewith incorporated sulfur and a chemical compound of titanium.

4. Rubber having therewith incorporated sulfur and titanic oxid.

5. The method of treating rubber, which comprises incorporating therewith a chemical compound of titanium.

6. The method of treating rubber, which comprises incorporating therewith titanic oxid.

7. The method of treating rubber, which comprises incorporating therewith sulfur and titanic oxid, and vulcanizing the mixture.

8. That step in the process of producing white rubber stock, which consists in filling the stock with titanium oxid.

9. The herein described process of producing white vulcanized rubber, which consists in filling the rubber with titanium oxid, and thereafter vulcanizing the rubber.

10. As a new article of manufacture, vulcanized rubber having as a filling constituent titanium oxid.

LOUIS E. BARTON.

Witnesses:
RALPH S. TABOR,
TOM C. GRAHAM.